March 19, 1957  C. H. PRESCOTT, JR., ET AL  2,785,972
PREPARATION OF URANIUM METAL
Filed June 12, 1945  2 Sheets-Sheet 1

INVENTORS
CHARLES H. PRESCOTT JR.
BY JOHN A. HOLMES

INVENTORS
CHARLES H. PRESCOTT JR.
JOHN A. HOLMES
BY

United States Patent Office 2,785,972
Patented Mar. 19, 1957

2,785,972

PREPARATION OF URANIUM METAL

Charles H. Prescott, Jr., and John A. Holmes, Berkeley, Calif., assignors to the United States of America as represented by the United States Atomic Energy Commission Application June 12, 1945, Serial No. 599,070

9 Claims. (Cl. 75—84.1)

This invention relates to the purification of uranium, and more particularly pertains to an improved method for the production of uranium of a relatively high degree of purity by decomposing a relatively volatile uranium iodide by contacting vapor thereof with a refractory body heated to a high temperature. In certain of its aspects the present invention constitutes an improvement upon the invention described and claimed in the copending application Serial No. 599,069, filed June 12, 1945, by Charles H. Prescott, Jr., and Frederick L. Reynolds.

It is an object of the present invention to provide a new and improved method of producing uranium of an extremely high degree of purity.

It is a further object of the invention to decompose a relatively volatile uranium iodide by contacting the uranium iodide with a refractory material heated to incandescence.

Still another object of the invention is to decompose uranium tetraiodide by contacting the tetra-iodide with a refractory body maintained at bright incandescence.

Another object of the invention is to prepare pure uranium by contacting iodine with uranium triiodide at an elevated temperature in an evacuated vessel to produce uranium tetraiodide, and thereafter contacting the thus-produced tetraiodide in vapor phase with a refractory body maintained at a very high temperature within an evacuated vessel.

Still another object of the invention is to produce uranium metal from uranium tetraiodide vapor by contacting the vapor with a refractory filament maintained at a high temperature below the melting point of uranium while carefully controlling within predetermined limits the partial pressure of iodine vapor present in the system.

Still another object of the invention is to provide a process for directly depositing uranium metal in solid form upon a heated refractory body at a temperature below the melting point of uranium, wherein uranium triiodide is employed as a reactant for producing uranium tetraiodide as an intermediate compound which latter, in vapor phase, is decomposed to metallic uranium by contact with the heated refractory body.

Figure 1:
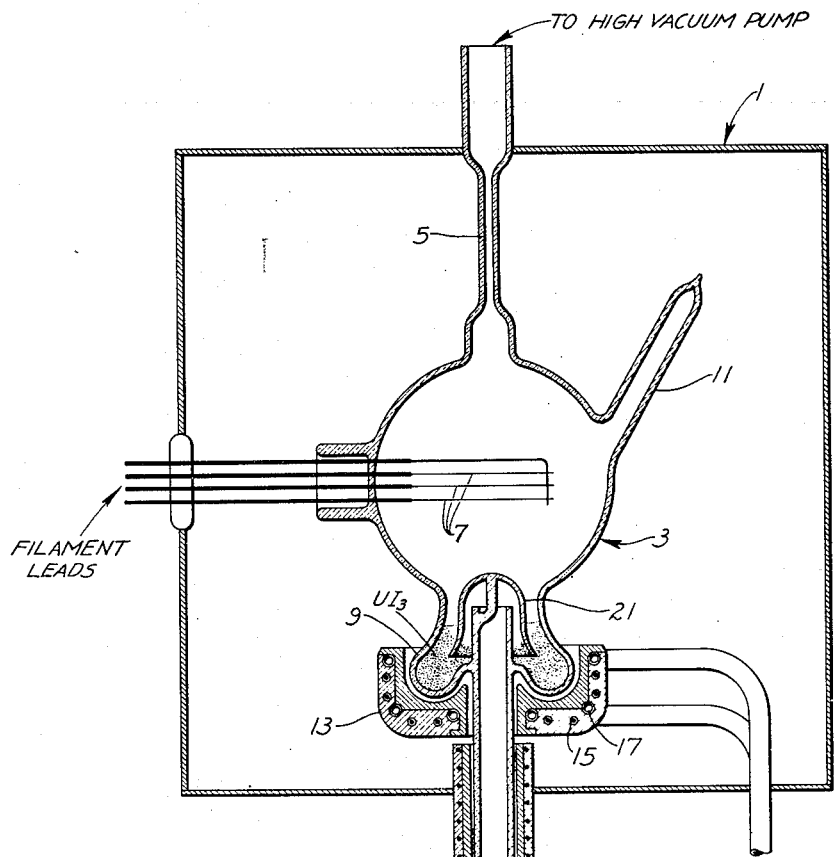
Figure 2:
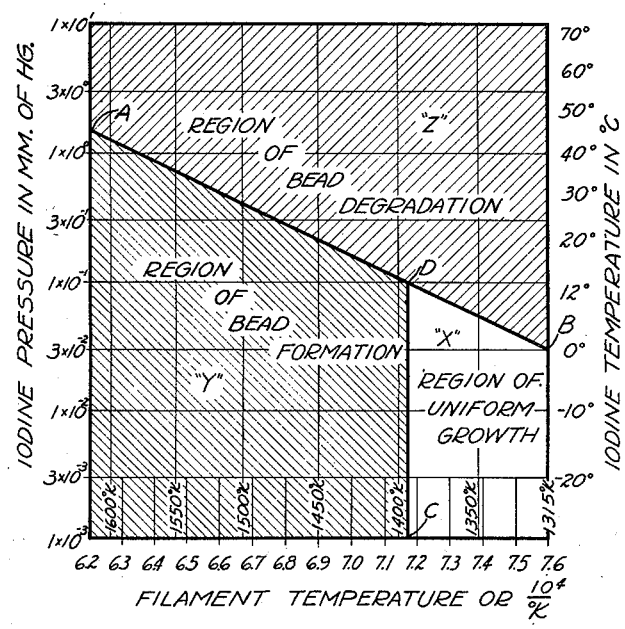
Figure 3:
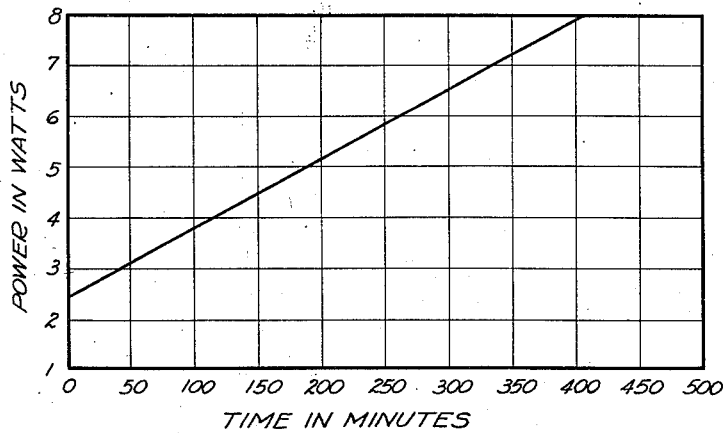

Still further objects of the invention, as well as a more complete understanding thereof, will become apparent from the description of the invention that follows, taken together with the accompanying drawings in which Figure 1 shows an apparatus suitable for carrying out the process of the invention, Fig. 2 is a phase diagram illustrating certain critical operating conditions for the process of the invention, and Fig. 3 is a diagram illustrating the functional relationship between power input and time with respect to certain aspects of the invention to be referred to more fully hereinafter.

Referring to Fig. 1 of the drawings, 1 is an oven or furnace designed to be maintained at a temperature of the order of 500° to 600° C. Such an oven may be conveniently maintained at the desired temperature by one or more suitably controlled electric heating elements, not shown. An oven of the reflector type has been found to be particularly desirable for present purposes. A reaction vessel 3, which is adapted to be evacuated to very low absolute pressures, is disposed within and adapted to be heated by the oven 1. A Pyrex glass flask is well adapted for use in this connection, inasmuch as an optical pyrometer may then be conveniently employed to assist in proper temperature control. The vessel 3 is provided with an outlet, including a capillary 5 disposed entirely within the oven so as to prevent deposition of $UI_3$ or $UI_4$ upon the walls thereof, and in communication therewith is a high vacuum pumping system, not shown. One or more filaments 7 are positioned within the vessel 3. The filaments are composed of a refractory material, such as tungsten, and are suitably supported within the tube in a manner well known in the vacuum tube art. The filaments are connected to a suitable source of current, not shown, to enable them to be heated to very high temperatures in a controlled manner.

The reaction vessel 3 is also provided with an annular well 9 in open communication with the main portion of the vessel and adapted to receive a charge of uranium triiodide. The triiodide is introduced into the vessel 3 by means of a suitable feed tube 11 that is adapted to be sealed off after introduction of the charge. The uranium triiodide well 9 is encompassed by an auxiliary temperature regulating device 13 including heating coils 15 and cooling tubes 17 to permit maintaining a close control of the temperature of the uranium triiodide charge independently of the temperature subsisting within the main portion of the reaction vessel 3. The heating coils 15 comprise suitably controlled electric resistance elements, while the cooling tubes are arranged to permit circulation of a suitable cooling fluid, such as air.

A vertically depending tube 19 is hermetically sealed to the vessel 3, and more particularly that portion of the vessel 3 adapted to contain the uranium triiodide charge, as shown in Fig. 1. The tube 19 extends along the axis of the annular well 9, and to a point somewhat above the normal upper level of the uranium triiodide charge therein. Sealed or otherwise attached to the upper end of tube 19, and in spaced-apart relation thereto, is an inverted bell cap 21 serving as a vapor flow-directing device for vapors issuing from the tube 19.

Surrounding the upper end of tube 19 is an auxiliary oven 23 that is provided for the purpose of preventing deposition of $UI_4$ in the tube. This auxiliary oven may be electrically heated, and, for convenience in assembly of the apparatus, may be of the split type.

The lower end of tube 19 is provided with a frangible cell or sealed capsule 25 containing iodine. Surrounding this lower end of tube 19 is an arrangement 27 for heating and/or cooling the contents of the capsule 25, whichever may be desired. For present purposes it is generally desired to employ temperatures below room temperature, and consequently this arrangement 27 may comprise a water bath. A suitably cooled brine solution may be employed therein for maintaining subzero temperatures, if desired.

In order to effect the release of the iodine from the sealed capsule 25 without disturbing the high vacuum imposed upon the system during operation, there is provided a lateral extension 29 sealed to, and in free communication with, the tube 19 at a point somewhat above the normal position of the capsule 25 in the tube. The extension 29 carries a glass-encased iron weight 31 that is adapted to be manipulated from without the evacuated system by a suitable magnet, in a manner well known to high vacuum technique, for the purpose of breaking the frangible capsule 25 which may be of thin-walled glass.

It has been found that if the mixture of $I_2$ and $UI_4$ vapors obtained by passing $I_2$ over solid $UI_3$ at a given reaction temperature are conveyed to a region of lower temperature, UI₃ is reformed and is deposited. It is therefore necessary, in order to keep the walls of the vessel 3 clean, to maintain the reaction vessel at a temperature somewhat in excess of the temperature of the UI₃ charge. This precaution is conveniently observed by suitably adjusting the heating elements of oven 1 relative to the heating elements of the auxiliary temperature regulating device 13 so as to keep the reaction vessel as a whole at a temperature of about thirty degrees higher than the region in the immediate vicinity of the uranium triiodide.

Having described one form of apparatus suitable for carrying out our invention, a preferred mode of procedure is as follows:

The apparatus was sealed to the vacuum system via the capillary tube 5 and a vacuum corresponding to an absolute pressure of the order of $1\times10^{-6}$ mm. Hg. was maintained for about 24 hours, during which time the portion of the apparatus confined within the reflector oven 1 was maintained at a temperature of approximately 550° C. After this preliminary bakeout, the system was allowed to cool and a dry inert gas (argon) was admitted until present at a pressure slightly in excess of 1 atmosphere. The feed tube 11 was then opened and a predetermined amount of UI₃ was admitted to the system therethrough. The feed tube 11 was then sealed off, the system again evacuated to substantially the same pressure as before, and the system as a whole again subjected to a bakeout for an additional 12 hours at a temperature of about 525° C. The tungsten filaments 7 were degassed during the above procedure by "flashing" them at about 2500° C. for approximately one-half hour.

After having conditioned the apparatus by the aforementioned procedure, the temperature of the vessel 3 was adjusted to about 525° C. by means of the oven 1, the temperature of the UI₃ charge in the well 9 was adjusted to about 500° C. by means of the auxiliary temperature control device 13, the auxiliary oven 23 was adjusted to about 525° C., and the pressure within the system was adjusted to approximately $1\times10^{-6}$ mm. Hg. When these operating conditions had been obtained, the iron weight 31 was appropriately manipulated by means of a magnet placed externally of the tube 19 and its lateral extension 29 in such a manner as to break the sealed glass capsule 25 and release the iodine vapor contained therein. The weight 31 was then returned to its original position of rest in the lateral extension 29 so as to offer no obstruction to the flow of iodine vapor through the tube 19 into the reaction vessel 3. It will be understood that the capsule 25 will have been prepared previously for use in the process by being charged with a sufficient quantity of iodine to substantially completely convert the trivalent uranium content of the given charge of UI₃ to tetravalent uranium, according to the reaction $UI_3 + \frac{1}{2} I_2 \rightarrow UI_4$. The rate at which iodine vapor is introduced into the reaction zone, represented by the annular well 9, for reaction with the triiodide to form the tetraiodide will be dependent largely upon the temperature imposed upon the iodine source 25 by the arrangement 27. The inverted bell 21 promotes efficient phase contact between the gaseous and solid reactant.

The formation upon the filaments 7 of an evenly distributed uranium coating was obtained by holding within well-defined limits the above-mentioned variables. As one illustration thereof, when the iodine temperature was held at approximately −11° C. by using a suitably cooled brine solution in the water bath arrangement 27, and the filaments 7 were held at a temperature of approximately 1032° C., a solid sheath of pure uranium metal was directly deposited in the form of a uniform coating over the filaments.

The mechanism of the uranium deposition is apparently as follows: Iodine vapor contacting the uranium triiodide at elevated temperatures converts the latter to the tetraiodide according to the reaction:

$$UI_3 + \tfrac{1}{2} I_2 \rightarrow UI_4 \qquad (1)$$

The tetraiodide thus formed is relatively more volatile than the triiodide and, under the high temperature and low pressure conditions prevailing in the reaction zone, is present in vapor phase. The tetraiodide vapor, upon contacting the extremely hot filament, decomposes in accordance with the reaction:

$$UI_4 \rightarrow U + 2I_2 \qquad (2)$$

The success of the present method, resulting in the direct deposition of uranium in solid phase upon a refractory body heated to a temperature below the melting point of uranium, is dependent in large part upon controlling within certain critical limits the partial pressure of the iodine present in the reaction zone, as well as the temperature of the refractory body upon which the uranium is deposited.

We have found that, for a given temperature of reaction for Equation 1 above, the boundary between (a) the operating conditions resulting in deposition of uranium metal upon the hot tungsten filament or other refractory body on the one hand, and (b) the operating conditions resulting in subsequent degradation or removal of uranium metal previously deposited thereon on the other hand, is such that the logarithm of the iodine partial pressure varies in a linear manner with respect to the reciprocal of the absolute temperature (in ° K.) of the filament or refractory body upon which uranium deposition takes place. More specifically, we have found that, for triiodide-to-tetraiodide conversion temperatures in the neighborhood of 800° K., this boundary may be defined as the locus of the line passing through the points representing: (1) a partial pressure of iodine of 0.1 mm. Hg and the melting point of uranium metal (approximately 1400° K.), and (2) an iodine partial pressure of 0.03 mm. and a temperature of 1315° K.

This boundary condition is illustrated diagrammatically in Fig. 2, wherein the line AB corresponds to the line just mentioned in the preceding paragraph. For convenience, the scale of ordinates along the right-hand side of the diagram shows the iodine temperatures (in ° C.) corresponding to the iodine partial pressures indicated by the scale of ordinates along the left-hand side of the diagram. It will be noted that the iodine partial pressure scale is logarithmic, while the filament temperature scale is reciprocal.

Operating conditions corresponding to values lying above line AB—i. e., in the region "Z" of Fig. 2—result in no deposition of metallic uranium (molten or otherwise) upon the filament, and in fact result in the degradation or removal of metallic uranium from the filament in cases where these values are inadvertently or otherwise reached subsequent to an initial step of uranium deposition.

Operating conditions corresponding to values lying below line AB result in the deposition of uranium upon the filamentary material. We have found further—and the present invention is based in large part upon this discovery—that there exist critical values of operating conditions below which the metallic uranium is deposited upon the filamentary or other material directly in solid phase as a uniform coating or sheath of pure metal. The critical boundary for these last-mentioned values is represented by the line CD of Fig. 2, corresponding to a filament temperature of approximately 1400° K., the melting point of uranium. Under operating conditions corresponding to values lying to the left of line CD and below the line AB—i. e., in the region "Y"—metallic uranium is deposited upon the base material, but in molten condition yielding beads or droplets (in connection with this last-mentioned procedure compare the copending application by Prescott and Reynolds referred to above). Under operating conditions corresponding to values lying to the right of line CD and below the line AB—i. e., in the region "X"—metallic uranium is deposited on the base material directly in solid phase as aforesaid.

As further illustrating our invention, the following additional operating results representing excellent deposition of pure solid uranium directly upon a thoriated tungsten filament may be given:

Filament temperature: 1032° to 1107° C. (1305° to 1380° K.)
Iodine partial pressure: 7×10⁻³ mm. Hg (corresponding to about −12° C. in the iodine reservoir)
Temperature of the reaction vessel 3: 520° to 560° C. (793° to 833° K.)
Temperature of the UI₃ in annular well 9: 500° to 530° C. (773° to 803° K.)
Temperature of the auxiliary oven 23: Approximately same as that of the reaction vessel 3, above
Pumping pressure on the reaction vessel 3: 10⁻⁶ to 10⁻⁷ mm. Hg The pure uranium metal deposited in this manner has a silvery metallic luster similar to that of platinum, and remains bright in air. The uranium metal is quite ductile and appears to be passive to hot concentrated HNO₃. Employing 10 mil thoriated tungsten filaments resulted in one instance in final uranium-coated filaments of 19.5 mils in diameter, from which it can be readily calculated that, for a uniform sheath of uranium metal, the latter should be present to the extent of nearly 74% by volume and slightly over 73% by weight, assuming specific gravities of uranium and tungsten of 18.7 and 19.3, respectively, and neglecting the effect upon the weight calculations of the slight amount of thorium present in the tungsten core. Actual chemical analysis of a section of the filament, by dissolving the metallic uranium sheath away from the tungsten core in hot HCl, indicated that the coated filament consisted of 75.18% uranium by weight. This is in good agreement with the calculated weight ratio. A photomicrograph (magnification: 150 diameters) of the cross-section of another portion of the same uranium-coated filament indicated that there was no appreciable interpenetration of material across the phase boundary, the latter showing up in the photograph clear and sharp.

The region "X" of Fig. 2 corresponds to the region of uniform growth of the solid uranium depositing upon the filamentary material. A convenient way of following this growth is by measuring the increasing power necessary to maintain the filament or filaments at constant temperature as the deposition proceeds. Fig. 3 represents a plot of power in watts necessary to maintain constant a given filament temperature vs. the time in minutes for the deposition, as determined during a representative run. It will be noted that the power input is a linear function of the elapsed time. Since the power input, equal to the radiation loss, is proportional to the exposed surface, it may be inferred that the surface increases as a linear function of elapsed time, or in other words, that the rate of deposition of metallic uranium per unit surface is a constant. Accordingly, it would appear that the deposition is controlled primarily by conditions existing at the surface of the filament at any given time, and only secondarily, if at all, by the exposed area of the uranium triiodide charge, diffusion of iodine vapor through that charge, etc.

It will be understood that the foregoing description of the process of our invention is merely by way of example, and numerous other modifications of the procedure therein described are within the scope of our invention. For example, the refractory body upon which the metallic uranium is deposited may be constructed of other materials, such as tantalum, carbon, molybdenum, platinum, and the like. It may also be constructed of uranium itself, thus enabling one to build up a solid bar of substantially pure uranium. In this case, of course, it is important to avoid raising the temperature of the uranium filament (or other shape) to the melting point of uranium at any time during the entire process.

If desired, the filament or refractory body upon which the uranium is deposited may be precoated with a refractory oxide, such as thorium dioxide or zirconium dioxide, particularly where the filament or refractory body selected is one (e. g., tungsten) that may tend to alloy with the deposited uranium in the event the temperature thereof is inadvertently raised too high during the course of deposition of uranium. It is of course not necessary to resort to this feature in cases where any slight intermingling of uranium and filament material that might occur at the interface can be tolerated.

It is further to be understood that one may employ refractory bodies in other than filamentary shapes for the purpose of depositing uranium thereon in accordance with the process of the present invention. For instance, in order to increase the efficiency of deposition by extending the surface of deposition, the refractory body may take the form of a plate, a disc, or even a tube through which the UI₄ vapor undergoing decomposition is passed. Induction heating may be substituted for all or a part of the resistance heating of the refractory body, if desired.

The temperature of the reaction vessel containing the uranium triiodide may be varied from the lowest temperature that will cause the triiodide and free iodine to react at a practicable rate to form the relatively volatile uranium tetraiodide, to a temperature at which the uranium tetraiodide vapor will decompose substantially prior to contact with the hot refractory body within the evacuated vessel. In practice, we have found such temperatures to be in the range of about 400° to 800° C. As previously indicated, the relationships shown in Fig. 2 obtain primarily for UI₃-to-UI₄ reaction temperatures of about 800° K., which temperature represents the approximate upper limit for practicable operation in Pyrex glassware. Higher temperatures may be employed with quartz ware, but some difficulty might be encountered due to reactivity of U or UI₃ with the material of the reaction bulb at higher temperatures, such as temperatures approaching 1000° C. The relationships shown in Fig. 2 are in fact in reasonably close agreement with experimentally observed results for UI₃-to-UI₄ reaction temperatures extending over the entire previously mentioned range of 500° to 530° C., in which range particularly desirable results were obtained. For UI₃-to-UI₄ reaction temperatures outside the range just mentioned, the line AB of Fig. 2 will be displaced proportionately to new positions substantially parallel to the one shown, the displacement being upward for temperatures above the stated range, and downward for temperatures below the stated range. The line CD, of course, will not be displaced. From the directions contained in the present description, those skilled in the art will encounter no difficulty in applying the principles of our invention to any specific conditions within its spirit.

The temperature of the refractory body itself must be sufficiently high as to cause relatively rapid decomposition of the uranium tetraiodide vapor to uranium metal directly thereon, yet sufficiently low as to be below the melting point of uranium. We have found operating temperatures of the order of 800° C. up to the melting point of uranium to be suitable for present purposes, with temperatures in the range of about 900° to approximately 1130° C. giving particularly desirable results. In fact, it is generally preferred to operate with filament temperatures somewhere within the last one hundred degrees of the range just mentioned. It may be mentioned that the filament temperatures referred to herein are based upon optical pyrometer measurements to which suitable correction factors have been applied in order to obtain as nearly as possible correct values for the true filament temperatures, all in accordance with accepted optical pyrometry practice. The remaining relatively lower temperatures referred to herein are based upon measurements taken with iron-constantan thermocouples suitably placed, in accordance with conventional practice.

A further temperature variable to be considered is that at which the reservoir 25 containing the solid iodine is maintained. The lowest temperature permissible therein must be sufficiently high as to cause the iodine to volatilize at a practicable rate, while the highest permissible temperature is determined by the maximum permissible iodine partial pressure having reference to the given filament temperature, all as set forth above in conjunction with the description relating to Fig. 2.

Although the employment of other total pressures within the system are contemplated as being within the purview of the afore-mentioned description, the process is preferably practiced while maintaining a total pressure within the system of well below 1 mm. Hg absolute. Care is taken by means of the evacuation to exclude oxygen or other gaseous or volatile oxide-forming material from the system during the process. Since other gases, particularly air, are substantially excluded during the process, the maximum total pressure in the reaction system will depend largely upon the partial pressures of the iodine and of the uranium tetraiodide, the two most volatile components present in the system, at the temperatures obtaining therein, the actual total pressure preferably being of the order of that obtainable by a high vacuum pump, such as an oil- or mercury-diffusion pump functioning with a pump inlet pressure of the order of $10^{-7}$ mm. Hg and operating upon the given system. The low pressure preferably employed has a favorable effect upon the rates of volatilization of the iodine and of the production of vapor of uranium tetraiodide for contacting the hot refractory body, other conditions remaining the same.

In the foregoing it will be noted that we have provided a process for producing solid uranium of a high degree of purity, and in relatively massive form, by contacting vapor of a relatively volatile uranium iodide, particularly the tetraiodide, with a refractory body heated to a high temperature but below the melting point of uranium, and under certain closely correlated iodine partial pressure conditions. In the examples and discussion of our process we have included the step of producing uranium tetraiodide by reaction of iodine with uranium triiodide placed in the same vessel as the hot refractory body. It will be understood, of course, that the uranium tetraiodide may be derived from any other source, e. g., preformed uranium tetraiodide prepared in the manner disclosed herein, or otherwise, such as by reaction of iodine directly upon impure uranium metal, or by reaction of iodine directly upon uranium carbide, or in any other desired manner, and the resulting tetraiodide, however produced, treated by the method of our invention, thereby causing the direct deposition in solid phase of pure uranium at a temperature below the melting point of uranium.

The uranium triiodide that is employed in the practice of our invention may be prepared in any suitable manner. However, since this compound has not hitherto been described in the literature, so far as we are aware, for the sake of completeness it may be pointed out that it may be conveniently prepared by the method described and claimed in the copending application of John A. Holmes, Serial No. 7,991, filed February 12, 1948, which issued as Patent No. 2,524,384 on October 3, 1950. This method may be described as follows: A copper tube 24" long and $1\frac{1}{16}$" I. D. was wound with Nichrome resistance wire, the distance between each turn increasing in such manner as to give a gradual temperature gradient along the tube, thus being adapted to function as a fractional condenser. To that end of the tube having the resistance wire relatively more closely wound, i. e., the end adapted to be maintained at the highest temperature during operation, is attached a 4" copper tube oven which in turn is wound with a Nichrome resistance element in such manner as to permit bringing the contents thereof to temperatures of the order of 500° to 530° C. The other (inlet) end of the 4" copper tube oven communicates with a tube for introducing iodine vapor into the oven or furnace for reaction with uranium metal disposed therein. The uranium metal may be in finely divided condition if desired, although this is not necessary since uranium in massive form, such as uranium turnings, is also well suited to the purpose. The iodine vapor originates in a separate iodine generating chamber which, after being charged with solid iodine, is sealed off under vacuum conditions, and broken only after the uranium metal and the tubing comprising the oven and condenser tubes have been thoroughly baked out prior to operation. Thereafter, the oven and condenser tubes are brought up to the operating temperatures mentioned below; the iodine chamber is broken or otherwise brought into communication with the oven, and iodine vapor passed over the charge of uranium metal in the oven. Unreacted iodine vapor passing on through both the oven and the fractional condensing chamber is condensed or isolated in a liquid air trap placed between the condenser and a mercury diffusion pump for bringing the system down to high vacuum. A vacuum corresponding to an absolute pressure of not greater than approximately $1 \times 10^{-5}$ mm. Hg is maintained throughout the preparation of the triiodide. In operation the electrically heated resistance elements are adjusted so that the temperature in the reaction chamber containing the uranium metal is of the order of 500° to 530° C., while the spaced-turn resistance element associated with the copper condensing tube maintains a temperature gradient therein corresponding to a temperature of the order of about 400° C. at the inlet end of the condenser (i. e., the end nearer the reaction tube) and falling off to a temperature of the order of 200° to 250° C. at the far end of the condenser tube. The iodine vapor from the iodine vapor generator is introduced into the reaction tube through which it flows in contact with the heated uranium metal, thereby forming uranium iodide vapors having a composition which may be expressed empirically by the formula $UI_x$, where "$x$" indicates the possibility of various mixtures of uranium triiodide, uranium tetraiodide, as well as possibly other uranium iodides not now identified. The mixture of uranium iodide vapors thus formed pass through the condenser where they are fractionally condensed in the inverse order of their relative volatilities; i. e., the least volatile being the first to condense. In this manner it is found that a mass of black crystals that normally condenses in that portion of the condenser nearest the outlet from the reaction chamber, where the actual temperature in the condensing zone varies from about 315° to 390° C., corresponds to uranium triiodide having the formula $UI_3$. Samples of uranium triiodide obtained in this manner, when subjected to analysis for their I/U atomic ratios, have given values such as 2.99, 3.01, and 3.02, thus indicating substantial agreement between the theoretical analysis and the actual analysis for the pure triiodide. Uranium iodide material recovered from the condensing chamber at points farther removed from the inlet to the condensing tube has been found to constitute material having a higher I/U atomic ratio, thus indicating the presence of higher iodides. The uranium triiodide material recovered from the fore part of the condenser is eminently suited for use in connection with the present invention.

These and other modifications of our method are included within the scope of our invention which is to be limited only as indicated by the appended claims.

What is claimed is:

1. In a process for producing solid uranium metal deposits upon a heated tungsten filament by the decomposition of uranium tetraiodide vapor upon contact therewith, the steps comprising continuously reacting iodine vapor with uranium triiodide to produce vaporous uranium tetraiodide, and continuously decomposing said vaporous uranium tetraiodide by contact with a tungsten filament maintained at a temperature below the melting point of uranium and above about 800° C. while maintaining the iodine partial pressure between about 0.003 and 0.10 mm. Hg in order to deposit uranium metal in the solid state upon said filament.

2. In a process for producing solid uranium metal deposits upon a heated tungsten filament by the decomposition of uranium tetraiodide vapor upon contact therewith, the steps comprising continuously contacting iodine vapor derived from solid iodine with uranium triiodide maintained at a temperature of about 400° C. to 800° C. to produce vaporous uranium tetraiodide, and simultaneously decomposing said vaporous uranium tetraiodide by contact with a tungsten filament maintained at a temperature in the range of about 800° C. to the melting point of uranium while maintaining the iodine partial pressure at the site of said decomposition below about 0.10 mm. Hg by regulating the temperature of said solid iodine and with exhaust pumping of the entire system, thereby depositing solid uranium upon said filament.

3. In a process for producing solid uranium metal deposits upon a heated tungsten filament by the decomposition of uranium tetraiodide vapor upon contact therewith, the steps comprising continuously producing uranium tetraiodide vapor by contacting iodine vapor derived from solid iodine with uranium triiodide maintained at a temperature in the range of about 400° to 800° C. and simultaneously decomposing said uranium tetraiodide vapor by contact with a tungsten filament maintained at a temperature of about 900° to 1130° C. and disposed in a reaction zone in free communication with the source of said tetraiodide vapor while maintaining the iodine partial pressure in said reaction zone below about 0.10 mm. Hg by controlling the temperature of said solid iodine and applying a high vacuum to the entire system so as to deposit solid uranium upon said filament.

4. In a process for depositing solid uranium metal upon a heated refractory body by the decomposition of vaporous uranium tetraiodide, the steps comprising maintaining said body at a temperature below the melting point of uranium, and causing said decomposition by regulating the iodine partial pressure existing in the decomposition zone to a value falling below the line connecting the point on a graph representing an iodine partial pressure of approximately 0.10 mm. Hg and a refractory body temperature of 1400° Kelvin and a second point on said graph representing an iodine partial pressure of approximately 0.03 mm. Hg and a refractory body temperature of approximately 1315° Kelvin, said iodine partial pressures being plotted logarithmically along the ordinate scale and said body temperatures being plotted as values of $10^4/°$ Kelvin along the abscissae scale.

5. In a process for depositing solid uranium metal upon a heated tungsten filament by the pyrolytic decomposition of vaporous uranium tetraiodide, the steps comprising maintaining said filament at a temperature below the melting point of uranium and above about 900° C., and promoting said decomposition by regulating the iodine partial pressure existing in the decomposition zone to a value falling below the extrapolated line connecting the point on a graph representing an iodine partial pressure of about 0.10 mm. Hg and a filament temperature of 1400° Kelvin and a second point on said graph representing an iodine partial pressure of about 0.03 mm. Hg and a filament temperature of about 1315° Kelvin, said iodine partial pressures being plotted logarithmically as ordinate values and said filament temperatures being plotted as $10^4/°$ Kelvin abscissae values.

6. In a process for producing solid uranium metal deposits upon a heated tungsten filament by the decomposition of uranium tetraiodide vapor upon contact therewith, the steps comprising producing iodine vapor from solid iodine maintained at about −11 C., contacting said iodine vapor with uranium triiodide maintained at a temperature of about 500° C. to produce uranium tetraiodide vapor, and decomposing said uranium tetraiodide vapor by contact with a refractory filament maintained at a temperature of about 1032° C. and disposed in a reaction zone maintained at about 525° C. while evacuating the system so as to maintain the iodine partial pressure in the decomposition zone at about the iodine vapor pressure over solid iodine maintained at a temperature of about −11° C.

7. The process as defined in claim 5, wherein said filament comprises a uranium metal filament.

8. The process as defined in claim 1, wherein said iodine partial pressure is maintained between about 0.003 and 0.10 mm. Hg by regulating the temperature of the iodine vapor source and the rate of evacuation of the system.

9. In a process for depositing solid uranium metal upon a heated refractory body by the decomposition of vaporous uranium tetraiodide, the steps comprising maintaining said body at a temperature in the range of about 800 to 1130° C., and promoting said decomposition by maintaining an iodine partial pressure in the range 0.10 to 0.03 mm. Hg in the region surrounding said refractory body to deposit the uranium metal as a solid thereon.

References Cited in the file of this patent

UNITED STATES PATENTS

| | | |
|---|---|---|
| 1,306,568 | Weintraub | June 10, 1919 |
| 1,671,213 | Van Arkel et al. | May 29, 1928 |
| 1,709,781 | De Boer et al. | Apr. 16, 1929 |
| 2,393,264 | Rentschler et al. | Jan. 22, 1946 |